(No Model.)
T. V. COWDEN.
TANDEM ATTACHMENT FOR BICYCLES.
No. 605,699.  Patented June 14, 1898.
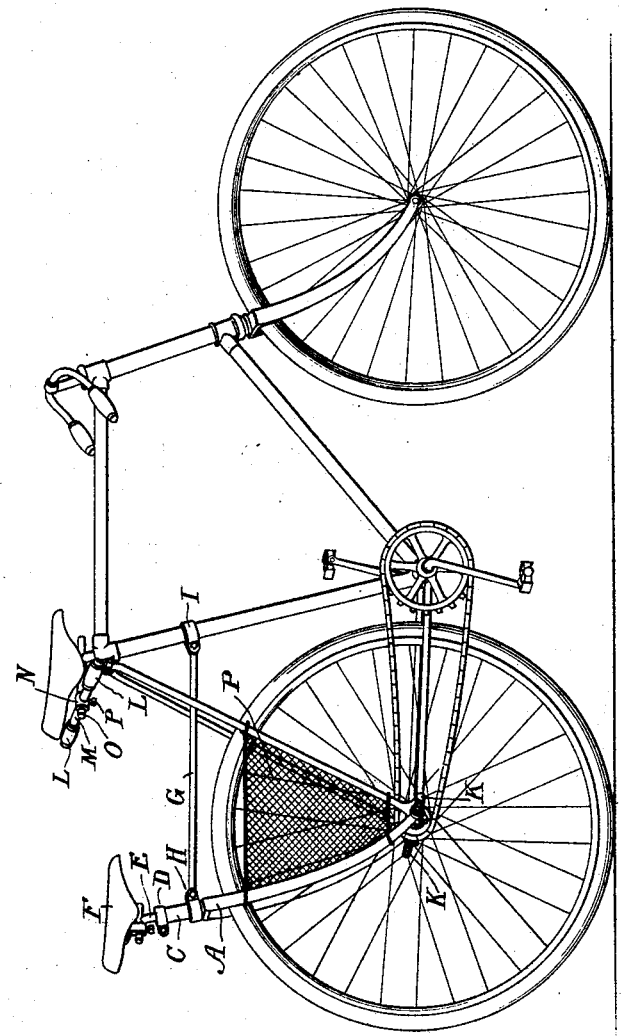
Witnesses:
F. DeWitt Goodwin
R. M. Pierce
Inventor:
Thomas V. Cowden
by Geo. W. Holgate
Attorney

UNITED STATES PATENT OFFICE.

THOMAS V. COWDEN, OF PHILADELPHIA, PENNSYLVANIA, ASSIGNOR TO CATHERINE A. PLUCKER, OF SAME PLACE.

TANDEM ATTACHMENT FOR BICYCLES.

SPECIFICATION forming part of Letters Patent No. 605,699, dated June 14, 1898.

Application filed September 16, 1897. Serial No. 651,903. (No model.)

*To all whom it may concern:*

Be it known that I, THOMAS V. COWDEN, a citizen of the United States, residing at Philadelphia, in the county of Philadelphia and State of Pennsylvania, have invented a certain new and useful Improvement in Tandem Attachments for Bicycles, of which the following is a specification.

My invention relates to a new and useful improvement in attachments for bicycles, and has for its object to provide a simple and effective device which may be quickly attached to or removed from a bicycle and when in place will convert a bicycle into a tandem or provide a second seat therefor, the object being to afford a ready means for the seating of a second person upon a machine without carrying them upon the handle-bars, as has heretofore been the usual method.

With these ends in view this invention consists in the details of construction and combination of elements hereinafter set forth, and then specifically designated by the claim.

In order that those skilled in the art to which this invention appertains may understand how to make and use the same, the construction and operation will now be described in detail, referring to the accompanying drawing, forming a part of this specification, in which the figure represents a bicycle having my improvement applied thereto.

In carrying out my invention as here embodied I provide a pair of forks A, which are adapted to pass over the rear wheels B of the bicycle and be secured to the stays thereof at the point of attaching the rear axle, as clearly shown. A convenient means for attaching the forks is to have holes formed in their lower ends adapted to pass over the threaded ends of the axle, and then, by running thereon the suitable nuts, both the rear axle and the forks A will be held in place. The upper portion of the forks has formed therewith or attached thereto the tube extension C, provided with a lug D, through which passes the seat-post E in the usual manner, thereby providing for the support of the seat or saddle F, and this arrangement will permit the raising and lowering of the seat, whereby it may be adjusted to the requirements of the person intending to occupy the same. The fork A is mounted at the proper angle relative to the frame of the machine by means of the stay-rod G, which is bolted to the clip H, the latter projecting from the fork, while the opposite end of the rod is attached to the frame of the machine by being bolted to the clip I, as clearly shown. This arrangement permits of the ready removal of the device from the bicycle-frame when desired or its reattachment thereto, as will be readily understood.

Supports K are provided for the feet of the rider and may be extensions of the nuts which run upon the threaded ends of the rear axle, after the manner of the ordinary step now in use, or these rests may be secured by bolts and clips to the members of the fork or to the rear stays of the bicycle-frame.

Handles L are provided for the use of the occupant of the seat F, said handles being secured upon the handle-bars M, which latter are carried by the socket N, arranged to pass over the rear projection O of the primary seat-post and be secured thereto by the set-bolt P. Thus the occupant of the seat F is provided with every accommodation that would be had were he seated upon an ordinary bicycle—that is to say, a perfect saddle, handle-bars, and foot-rests—thereby in no wise interfering with the occupant of the primary seat and being in no danger of falling from the machine.

A suitable wheel-guard P may be attached to both sides of the machine between the upper rear braces of the bicycle and the forks A of the attachment, as clearly shown, and in any suitable manner so as to protect the legs of the rider occupying the seat F from entanglement with the spokes of the rear wheel.

Having thus fully described my invention, what I claim as new and useful is—

The herein-described tandem attachment consisting of a tubular socket, in which a saddle-post may be fitted and adjusted vertically, forks formed with the lower portion of said socket, a clip slidably fitted on said tubular socket, a brace-rod secured to said clip, and a second clip carried on the forward end of the rod, as and for the purpose described.

In testimony whereof I have hereunto affixed my signature in the presence of two subscribing witnesses.

THOMAS V. COWDEN.

Witnesses:
S. S. WILLIAMSON,
SAMUEL L. TAYLOR.